Sept. 16, 1952            S. G. GALLO            2,610,977
RECOVERY OF ALCOHOLS FROM HYDROCARBON OILS
Filed Dec. 6, 1947
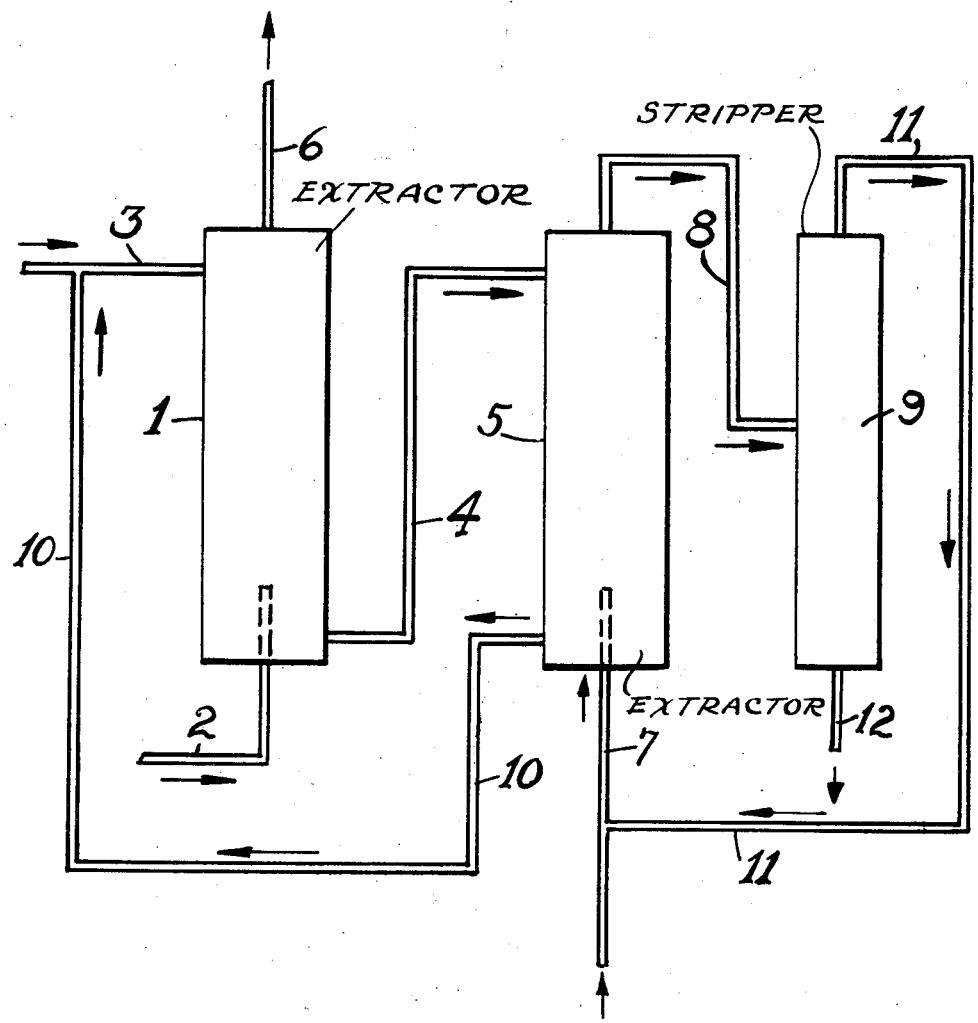
Salvatore G. Gallo Inventor
By Henry Berk Attorney Patented Sept. 16, 1952

2,610,977

UNITED STATES PATENT OFFICE 2,610,977

RECOVERY OF ALCOHOLS FROM HYDROCARBON OILS

Salvatore G. Gallo, Roselle, N. J., assignor to Standard Oil Development Company, a corporation of Delaware Application December 6, 1947, Serial No. 790,136

3 Claims. (Cl. 260—450)

The present invention relates to an improvement in the recovery of oxygenated organic compounds from solutions thereof with hydrocarbon oils. The invention is particularly applicable to the recovery of higher oxygenated compounds from crude oils obtained by the catalytic hydrogenation of carbon oxides.

Various processes are known to the art in which a mixture of hydrocarbons and organic oxygen-containing compounds are produced. Some of these processes are the low temperature carbonization of coal, peat and similar materials, destructive hydrogenation of coals, wood, shales, etc. Numerous oxidation processes, particularly oxidation of petroleum oil fraction such as is described in Ellis' Chemistry of Petroleum Derivatives, vol. 1, chapter 36, pages 830 to 845, also yield mixtures of oxygenated compounds and hydrocarbons. This invention is particularly applicable to products obtained from a process whereby hydrogen and oxides of carbon are reacted in the presence of a catalyst to produce synthetic hydrocarbons, water and numerous organic oxygenated compounds. The oxygen-containing compounds produced in this synthesis operation may be a major product or a relatively small by-product depending upon the operating conditions. These oxygenated materials which are extremely valuable as chemicals, consist of a mixture of alcohols, acids, aldehydes, ketones and esters and are difficult to separate from the hydrocarbon oil because first, they are so numerous, secondly they frequently occur, as in the case of Fischer Tropsch synthesis, in the presence of hydrocarbons of substantially the same boiling range, thirdly, they often form azeotropes with each other and with the hydrocarbon oils.

Normally when the products of the above-described synthesis operation are condensed and allowed to settle the condensate separates into a di-phase system, that is, an upper oil layer comprising substantially hydrocarbons and hydrocarbon-soluble oxygen-containing materials and a lower water phase comprising substantially water and water-soluble oxygen-containing materials. The oxygen-containing organic compounds formed in the synthesis operation range from very low molecular weight compounds to very high molecular weight compounds and therefore find themselves distributed throughout the oil phase and the water phase depending on their solubilities in these respective phases. In general, it can be said that the bulk of the organic oxygen-containing compounds of one to three carbon atoms will enter the aqueous phase while the bulk of the compounds containing four carbon atoms and more per molecule will be found in the oil layer, although it should be borne in mind that the separation of materials into their respective phases is oftentimes not cleancut and depends to a large extent upon the conditions involved and the overall distribution of the materials in the condensate.

The material subjected to extraction, according to the terms of this invention, is complex in nature. It is composed of hydrocarbons including paraffins, olefins and in some cases, small amounts of aromatics. In addition, it contains anywhere up to about 50% or more of oxygen-containing materials, particularly of high molecular weight such as those set out above. In cases where the material is derived from the hydrocarbon synthesis operation, the oil will have dissolved in it alcohols, acids, aldehydes, ketones and esters. The esters predominate among the high boiling compounds, particularly that fraction boiling above 350° F. while carbonyl compounds, that is, aldehydes and ketones, acids and alcohols, predominate among the oxygen-containing compounds boiling at temperatures up to about 350° F. Ordinarily the amounts of alcohols and acids found decrease with increasing analytical distillation temperatures due undoubtedly to the fact that they undergo esterification reactions during such distillation treatments. The oxygen content of the hydrocarbon oils resulting from the synthesis operation generally runs from one weight percent to ten weight percent.

Extraction methods employed for removing oxygenated compounds from oils include extraction with water or with various solvents in anhydrous or aqueous conditions. Typical solvents are the aliphatic alcohols such as methanol, ethanol, etc., the aliphatic ketones such as acetone, methyl ethyl ketone etc., the glycols particularly butylene glycol-1,3, butylene glycol-2,3 and propylene glycol, the lower aliphatic acids, such as acetic and propionic, and other polar organic oxygenated compounds. Aqueous salt solutions may also be employed in the extraction operation, e. g. aqueous solutions of sodium acetate. The aqueous salt solutions may be employed alone or in conjunction with one of the solvents of the type named. Any organic solvent having a preferential solvent power for the oxygen-containing substances over the hydrocarbon oils may be employed as the extractant.

The general fact has been recognized that the extraction of oxygenated compounds from hydrocarbon oils such as those produced in the hydrocarbon synthesis process, by the use of the solvents described, is rendered difficult because of the adverse capacity and selectivity relations of such solvents. Stated more specifically, such solvents which extract the oxygenated compounds from the hydrocarbon oils with a relatively high degree of selectivity have a correspondingly low capacity which necessitates the use of high solvent to oil ratios. Such adverse relationships are apparent particularly with the aqueous solvents, and particularly with the extraction of the higher molecular weight oxygenated compounds. The use of high solvent to oil ratios is particularly detrimental in the recovery of the oxygenated compounds from the extract phase. The working up of such an extract layer by distillation is difficult and cumbersome due to the high latent heats of vaporization of the solvents, and the exceedingly large amounts of solvent to be removed requiring, of course, large stripping facilities.

In connection with the use of aqueous methanol as an extractant, it has been found that solvent to oil ratios of 8 and 9 to 1 are necessary to attain satisfactory clean-up and selectivity of oxygenated compounds, particularly the higher alcohols in the $C_8$–$C_{18}$ molecular weight range, from hydrocarbon oils containing them.

The process of this invention represents an economical and efficient method of overcoming these difficulties in the recovery of the valuable oxygenated compounds. This invention is directed to the treatment of the extract layer produced by contacting the oxygen-compound-containing oil with a first solvent in the normal extraction process. The resulting extract layer is contacted with a small volume of a second solvent preferably a low boiling hydrocarbon and more preferably a low boiling aliphatic hydrocarbon of $C_5$–$C_9$ range, whereby the oxygenated compounds present in the first extract layer are removed from it. The term low boiling as applied to the second solvent means low boiling with respect to the solute, i. e. the material being extracted. The resulting lean aqueous first solvent may then be recycled for the extraction of additional amounts of the oxygen compound-containing oil.

The solution of the oxygen compounds in the second solvent e. g. a light hydrocarbon may be treated in one of a number of methods to recover the oxygenated compounds. Preferably, the concentrated solution of oxygenated compounds in the light hydrocarbon is distilled in a stripping zone to remove the light hydrocarbon leaving behind as a residue the oxygenated compounds. This procedure effects further economies in the recovery of the oxygenated compounds by virtue of the fact that the light hydrocarbons have considerably lower latent heats of vaporization than the solvent of the type employed. Alternatively, the solution of the oxygenated compounds in the light hydrocarbon may be treated with a third solvent or with a second wash of the second solvent. Since the oxygenated compounds in the light hydrocarbon are at a much higher concentration than that in which they were present in the original hydrocarbon oil, they may be extracted with a much smaller volume of solvent than that employed in the original extraction. The oxygenated compounds are recovered from the resulting extract layer by distilling off the solvent with the simultaneous recovery of the oxygenated compounds as the distillation residue.

The drawing represents a diagrammatical sketch of typical apparatus in which the process of the invention may be carried out.

Referring to the drawing, numeral 1 represents an extraction zone into which hydrocarbon oil rich in organic oxygenated compounds and particularly oxygenated compounds of the same boiling range, is led via line 2. Solvent of the type previously discussed for extraction of the oxygenated compounds enters the extraction zone at a point near the top through line 3. The feed and solvent are allowed to thoroughly mix in countercurrent flow within the extraction zone after which the lean oil from which the bulk of the oxygenated compounds has been recovered is removed overhead from the extraction zone via line 6. Extract rich in oxygenated compounds is withdrawn through line 4 at a point near the bottom of the extraction zone and led to vessel 5 being introduced at a point somewhat below exit line 8. Light hydrocarbon such as n-heptane, enters vessel 5 at the bottom thereof through line 7 and passes countercurrently to the flow of extract. The light hydrocarbon removes the oxygenated compounds from the extract and the mixture thereof passes overhead from the extraction zone via line 8 to stripper 9. Lean solvent is recovered from the bottom of vessel 5 and recycled via line 10 to solvent feed line 3 for use in further extraction operations. In the stripper 9 heat is applied to the mixture of light hydrocarbons and oxygenated compounds and the light hydrocarbon distills overhead and is recycled to feed line 7 via line 11 for further use. The concentrated oxygenated compounds are recovered as bottoms from the stripper via line 12 and can be further processed as desired, e. g. separation into particular compounds such as alcohols, ketones, etc. In the event solvent extraction is employed to recover the oxygenated compounds from the light hydrocarbons the stripper 9 may be employed as an extraction vessel and the operation is similar to that carried out in extraction zone 1.

The following six examples illustrating specific applications of my invention show the advantages which may be thereby obtained. The examples set forth below are illustrative only and are not intended as limitations of the inventions.

TABLE 1

*Recovery of solute from dilute extract layers*

Scheme: 1 part blend [1] + 8 parts Solvent 1 → Extr. Layer-1 (8+parts) + Raffinate-1; Extr. Layer-1 + 3 parts Solvent-2 → Extract Layer-2 + Raffinate-2

| Examples | 1 | 2 | 3 | 4 | 5 | 6 |
|---|---|---|---|---|---|---|
| Solute | n-Octanol | n-Octanol | n-Octanol | n-Decanol | n-Decanol | n-Dodecanol |
| Solvent-1 | 80% Propylene Glycol | 60% Ethyl Alcohol | 55% Ethyl Alcohol | 55% Ethyl Alcohol | 55% Ethyl Alcohol | 81% methanol |
| Solvent-2 | benzene | benzene | n-hexane | n-heptane | 54 Naphtha [2] | n-heptane |
| Weight percent Solute in Extr. Layer-1 | 1.75 | 1.93 | 1.62 | 1.21 | 1.27 | 5.9 |
| Weight Percent Solute in Extr. Layer-2 | 2.2 | 3.55 | 3.16 | 3.28 | 2.94 | 15.0 |
| Percent Cleanup [3] | 41 | 66 | 52 | 75 | 68 | 80 |
| Distr. Coeff. (kalc.) [4] | 2.16 | 5.5 | 4.1 | 10.8 | 7.3 | 11 |

[1] Blends were composed of 20 volume percent of the $C_8$ or $C_{10}$ alcohol in alkylate bottoms (boiling range 150°–300° C.) except n-dodecanol blend which was 25 weight percent in petroleum naphtha (boiling range 155°–215° C.)
[2] Boiling range 71°–116° C.
[3] Percent of solute removed by Solvent-2 from Extract Layer-1.
[4] Concentration of alcohol in Raffinate-2 (in order) 1.02, 0.648, 0.775, 0.303, 0.405, 1.3 weight percent.

The light hydrocarbons suitable for use in this invention include any hydrocarbon or mixture of hydrocarbons having a boiling point or boiling range different from that of the oxygenated compounds to be recovered. The aliphatic hydrocarbons, particularly those of the $C_5$ to $C_9$ range are preferred, and cuts of the same such as a $C_6$ cut or $C_7$ cut as obtained in hydrocarbon distillation operations on petroleum naphthas are suitable. Aromatic hydrocarbons of low boiling range are likewise suitable such as benzene, toluene, etc.

The process of this invention may be employed particularly therefore when it is desired to produce a concentration of the desired component extracted; or, where, for various reasons such as stability, heat requirements, prevention of undesirable azetrope formation etc., it becomes necessary to transfer the desired extracted component from the primary solvent to a more advantageous medium. Where the second solvent is employed only for purposes of transfer the requirement that the second solvent be low-boiling may be relaxed somewhat and a solvent of higher boiling range may be employed.

Having thus described and illustrated the invention in a manner such that it may be practiced by those skilled in the art, I claim:

1. A process for the separation of preferentially oil-soluble aliphatic alcohols from a solution thereof in hydrocarbons which comprises extracting said solution with an aqueous aliphatic alcohol solvent to form a first extract phase comprising the alcohols physically dissolved in the aqueous solvent and a first raffinate phase comprising the hydrocarbons, separating the phases, contacting the first extract phase with a low boiling hydrocarbon whereby the alcohols become separated from the aqueous solvent and concentrate in the low boiling hydrocarbon forming a second extract phase, separating the aqueous solvent from the second extract phase, and removing the low boiling hydrocarbon from the second extract phase.

2. A process according to claim 1 in which the oil soluble aliphatic alcohols are alcohols containing 8 to 18 carbon atoms per molecule and in which the solvent is aqueous methanol.

3. A process according to claim 2 in which one of the oil soluble, aliphatic alcohols is dodecanol, and in which the low boiling hydrocarbon is n-heptane.

SALVATORE G. GALLO.

REFERENCES CITED

The following references are of record in the file of this patent:

UNITED STATES PATENTS

| Number | Name | Date |
| --- | --- | --- |
| 1,943,427 | Franzen et al. | Jan. 16, 1934 |
| 2,083,125 | Scheuble | June 8, 1937 |
| 2,193,321 | Liethe | Mar. 12, 1940 |
| 2,274,750 | Soenken et al. | Mar. 3, 1942 |
| 2,457,257 | Michael et al. | Dec. 28, 1948 |
| 2,505,752 | Burton | May 2, 1950 |
| 2,571,151 | McGrath et al. | Oct. 16, 1951 |

OTHER REFERENCES

Naval Tech. Mission, page 90, Aug. 26, 1946.